(12) United States Patent
Kinoshita et al.

(10) Patent No.: US 6,902,757 B2
(45) Date of Patent: Jun. 7, 2005

(54) PROCESS FOR PRODUCING A MEMBRANE-ELECTRODE ASSEMBLY FOR SOLID POLYMER ELECTROLYTE FUEL CELLS

(75) Inventors: Shinji Kinoshita, Kanagawa (JP); Atsushi Mukoyama, Kanagawa (JP); Hiroshi Shimoda, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 357 days.

(21) Appl. No.: 10/245,633

(22) Filed: Sep. 18, 2002

(65) Prior Publication Data

US 2003/0064148 A1 Apr. 3, 2003

(30) Foreign Application Priority Data

Sep. 19, 2001 (JP) ........................................ 2001-284538

(51) Int. Cl.[7] ................................................. B05D 5/12
(52) U.S. Cl. ........................ 427/115; 427/356; 427/358
(58) Field of Search ................................. 427/115, 356, 427/358; 118/411

(56) References Cited

U.S. PATENT DOCUMENTS 4,935,264 A   6/1990  Tsujino et al.
6,344,088 B1 * 2/2002  Kamikihara et al. ........ 118/712
6,537,376 B1 * 3/2003  Yasui et al. .................. 118/411
6,582,768 B2 * 6/2003  Mandai et al. .............. 427/356

FOREIGN PATENT DOCUMENTS

EP        0 654 837        5/1995

OTHER PUBLICATIONS

Patent Abstracts of Japan, JP 03–245463, Nov. 11, 1991.

* cited by examiner

Primary Examiner—Brian K. Talbot
(74) Attorney, Agent, or Firm—Oblon, Spivak, McClelland, Maier & Neustadt, P.C.

(57) ABSTRACT

A process for producing a membrane-electrode assembly for solid polymer electrolyte fuel cells, including providing a die having an inlet for introducing coating liquids, a linear exit for discharging the coating liquids, and at least one guide partition wall for partitioning the inlet into compartments extending to the linear exit and slanted relative to the direction in which a substrate facing the linear exit moves relatively to the die, introducing the coating liquids from the inlet, and passing the coating liquids through the compartments separately, and moving at least one of the die and substrate so that the substrate relatively moves at substantially right angles to the longitudinal direction of the linear exit of coat the substrate with the coating liquids and form catalyst layers.

18 Claims, 7 Drawing Sheets

X

US 6,902,757 B2

PROCESS FOR PRODUCING A MEMBRANE-ELECTRODE ASSEMBLY FOR SOLID POLYMER ELECTROLYTE FUEL CELLS

BACKGROUND OF THE INVENTION

1. Field of the Invention

The present invention relates to a process for producing a membrane-electrode assembly for solid polymer electrolyte fuel cells. Particularly, it relates to a process for producing a membrane-electrode assembly for solid polymer electrolyte fuel cells having its reaction efficiency improved by dissolving non-uniformity of the current density in the plane of the membrane-electrode assembly by a simple method.

2. Discussion of the Background

Fuel cells are expected to be widely used in the future since their power generation efficiency is high, and their load to the environment is light. Particularly solid polymer fuel cells are expected to be widely spread for movable bodies such as automobiles, or as a distributed power generation system or a cogeneration system for home use, since their power density is high and their operating temperature is low, whereby downsizing and cost cutting are easy as compared with other fuel cells.

In general, as illustrated in the sectional view of FIG. 4, a membrane-electrode assembly 101 for solid polymer electrolyte fuel cells comprises a solid polymer membrane 103 comprising an ion exchanger polymer, catalyst layers 105a and 105b of an anode and a cathode, respectively, bonded to both sides of the solid polymer membrane 103, and e.g. carbon paper or carbon cloth as gas diffusion layers 107a and 107b disposed outside the catalyst layers.

Outside the gas diffusion layers 107a and 107b, an electrically conductive separator 109 is disposed. On the separator 109, gas flow paths 111a and 111b, which face the gas diffusion layers 107a and 107b, are formed. The gas flow path has, specifically, various modes such as a series groove 111c and a parallel groove 111d, which extend from the inlet 109a to the exit 109b, as shown in FIGS. 5 and 6.

As described above, the membrane-electrode assembly 101 is formed by bonding the catalyst layers 105a and 105b containing a noble metal on both sides of the polymer electrolyte membrane 103. The catalyst layers 105a and 105b are formed by a method of directly coating the polymer electrolyte membrane 103 with an ink for formation of a catalyst layer, containing as the main component a dispersion of a catalyst-supported carbon and a solid polymer electrolyte resin (such as a perfluorocarbon polymer having sulfonic acid groups) or a method wherein a substrate is preliminarily coated with the above ink to form catalyst layers 105a and 105b in the form of a sheet, which are bonded to the polymer electrolyte membrane 103 by means of e.g. hot pressing.

As a specific method of preparing the catalyst layers 105a and 105b on the substrate, a method of forming the layers on the substrate 125 for coating by using a die 121 shown in FIG. 7 may be mentioned. In this method, the substrate 125 for coating is coated, for example, with the above-described ink for formation of a catalyst layer to form the catalyst layer 105a as one of the catalyst layers. Further, a dispersion of an ion exchange polymer may be cast on the catalyst layer 105a by using the die 121 to form the polymer electrolyte membrane 103. Otherwise, the polymer electrolyte membrane 103 may be formed by a cast film forming in advance, and the catalyst layer 105a is formed thereon.

The membrane-electrode assembly 101 for solid polymer electrolyte fuel cells thus constituted makes a fuel gas and an oxidant gas pass through the gas flow paths 111a and 111b, respectively, of the separator 109, and at the same time, transmits electricity to the outside through the gas diffusion layers 107a and 107b, and with which electric energy can be taken out.

In the membrane-electrode assembly 101, a cell reaction takes place by the gas supplied from the separator 109. The supplied gas is consumed by the cell reaction, and a reaction product such as water is formed, and accordingly the reaction gas composition, a moistening condition of the gas, etc. change along the gas flow path and as a result, the reaction conditions also change along the gas flow path. Due to this change of conditions, the current density becomes non-uniform in the plane of the membrane-electrode assembly 101, which is one cause of decrease in cell performance.

To overcome the above problems, in order to secure a uniform reaction efficiency in the entire plane of the membrane-electrode assembly 101, it has been proposed to change the amount of a catalyst from the inlet 109a toward the exit 109b of the gas flow path (JP-A-3-245463, JP-A-2000-149959). Specifically, the coating amount of the catalyst is changed utilizing the concentration gradient depending upon the distance in a spray coating or by utilizing the concentration gradient depending upon the number of coating in the screen printing.

However, a high level of control a coating thickness is required to change the coating amount for the catalyst layers 105a and 105b of the membrane-electrode assembly 101 by spray coating. Further, in the case of coating by the screen printing, a complicated coating process and a gradual change of the coating amount are inevitable.

Under these circumstances, it is an object of the present invention to provide a process for producing a membrane-electrode assembly for solid polymer electrolyte fuel cells having its reaction efficiency improved, by dissolving non-uniformity in the current density in the plane of the membrane-electrode assembly by a simple method.

SUMMARY OF THE INVENTION

The present invention provides a process for producing a membrane-electrode assembly for solid polymer electrolyte fuel cells comprising a polymer electrolyte membrane, and a cathode and an anode facing each other with the polymer electrolyte membrane interposed therebetween, each having a catalyst layer adjacent to the polymer electrolyte membrane, which comprises forming at least one of the catalyst layers of the cathode and the anode by using coating liquids containing a catalyst and an ion exchange resin, wherein a die equipped with an inlet to introduce the coating liquids and a linear exit from which the coating liquids are discharged is used, the die has a guide partition wall to compartmentalize the inlet into a plurality of compartments extending toward the linear exit, the compartmentalizing direction of the guide partition wall is slanted relative to the direction in which a substrate for coating which faces the linear exit moves relatively to the die, a plurality of coating liquids having different compositions is introduced from the inlet so that they are not mixed with each other and pass through the plurality of the compartments separately towards the linear exit, and at least one of the die and the substrate for coating is moved so that the substrate for coating relatively moves at substantially right angles to the longitudinal direction of the linear exit to coat the substrate for coating with the coating liquids to form the catalyst layer, so that the composition of the catalyst layer continuously changes in at least some part in the longitudinal direction of the linear exit of the die by the allocation of the plurality of the coating liquids.

At the inlet of the die, a guide partition wall is provided. A plurality of coating liquids corresponding to the compartments compartmentalized by the guide partition wall is introduced without being mixed with each other, and the plurality of coating liquids is guided along the streamline flow while maintaining their relation in the respective compartments, and reaches the linear exit.

The guide partition wall compartmentalizes the inlet at a slant relative to the direction in which a substrate for coating moves relatively to the die, whereby the plurality of coating liquids is allocated slantly relative to the direction in which the substrate for coating moves relatively to the die at the linear exit. The substrate for coating is coated with the plurality of slantly allocated coating liquids from the linear exit by the movement of the substrate for coating relative to the die, whereby a coating film is formed wherein the plurality of coating liquids is superposed slantly in the thickness direction of the coating film corresponding to the compartments by the guide partition wall.

Accordingly, in the process for producing a membrane-electrode assembly for solid polymer electrolyte fuel cells of the present invention, the composition of the catalyst layer of the membrane-electrode assembly for solid polymer electrolyte fuel cells can continuously be changed along the direction in which the gas to be supplied to the catalyst layer flows (hereinafter referred to as gas flow). Accordingly, a membrane-electrode assembly for solid polymer electrolyte fuel cells which can secure the cell reaction with a high efficiency over the entire plane, regardless of the upstream or downstream hand of the gas flow path, can be produced.

Further, in the present invention, it is preferred to make the thickness of the catalyst layer uniform by the above process.

To the thickness of the catalyst layer is no-uniform, when e.g. carbon cloth or carbon paper as a gas diffusion layer is disposed adjacent to the catalyst layer, the adhesion between the catalyst layer and the gas diffusion layer tends to be inadequate. Further, at the thick portion of the catalyst layer, diffusion of the reaction gas into the electrode reaction surface tends to be poor, whereby the fuel cell properties may decrease. By the above process, the thickness can be made uniform even when the composition continuously changes in the plane of the catalyst layer.

Further, the present invention provides a process for producing a membrane-electrode assembly for solid polymer electrolyte fuel cells comprising a polymer electrolyte membrane, and a cathode and an anode facing each other with the polymer electrolyte membrane interposed therebetween, each having a catalyst layer disposed adjacent to the polymer electrolyte membrane, which comprises forming the polymer electrolyte membrane by using coating liquids containing an ion exchange resin, wherein a die equipped with an inlet to introduce the coating liquids and a linear exit from which the coating liquids are discharged is used, the die has a guide partition wall to compartmentalize the inlet into a plurality of compartments extending toward the linear exit, a plurality of coating liquids having different compositions is introduced from the inlet so that they are not mixed with each other and pass through the plurality of the compartments separately, the compartmentalizing direction of the guide partition wall is slanted relative to the direction in which a substrate for coating which faces the linear exit moves relatively to the die, and at least one of the die and the substrate for coating is moved so that the substrate for coating relatively moves at substantially right angles to the longitudinal direction of the linear exit to coat the substrate for coating with the coating liquids to form the polymer electrolyte membrane, so that the composition of the polymer electrolyte membrane continuously changes in at least some part in the longitudinal direction of the linear exit of the die by the allocation of the plurality of the coating liquids.

In the process for producing a membrane-electrode assembly for solid polymer electrolyte fuel cells of the present invention, the composition of the polymer electrolyte membrane of the membrane-electrode assembly for solid polymer electrolyte fuel cells can be continuously changed along the gas flow. Accordingly, a membrane-electrode assembly for solid polymer electrolyte fuel cells which can secure a cell reaction with a high efficiency over the entire plane regardless of the upstream or downstream hand of the gas flow path, can be produced with a simple operation. Further, in the same manner as the catalyst layer, according to this process, the thickness of the polymer electrolyte membrane can also be made uniform even when the composition continuously changes in the plane.

DESCRIPTION OF THE EMBODIMENTS

Now, the present invention will be described in detail with reference to the preferred embodiments.

In the process of the present invention, a catalyst layer or a polymer electrolyte membrane of the membrane-electrode assembly for solid polymer electrolyte fuel cells is produced by coating. Now, the catalyst layer or the polymer electrolyte membrane which will be referred to as a coating film, produced by the coating process of the present invention, will be explained below. A die used in the film coating process is shown in a plane view (FIG. 1(a)), a front view (FIG. 1(b)) and a sectional view along I—I line of FIG. 1(b) (FIG. 1(c)).

Figure 1A:
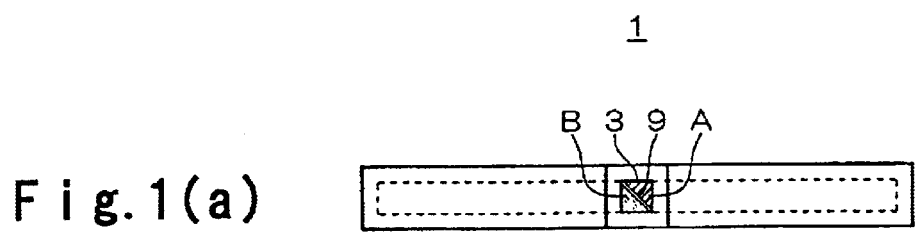
FIG. 1(a) is a plane view illustrating a die used in the process of the present invention.
Figure 1B:
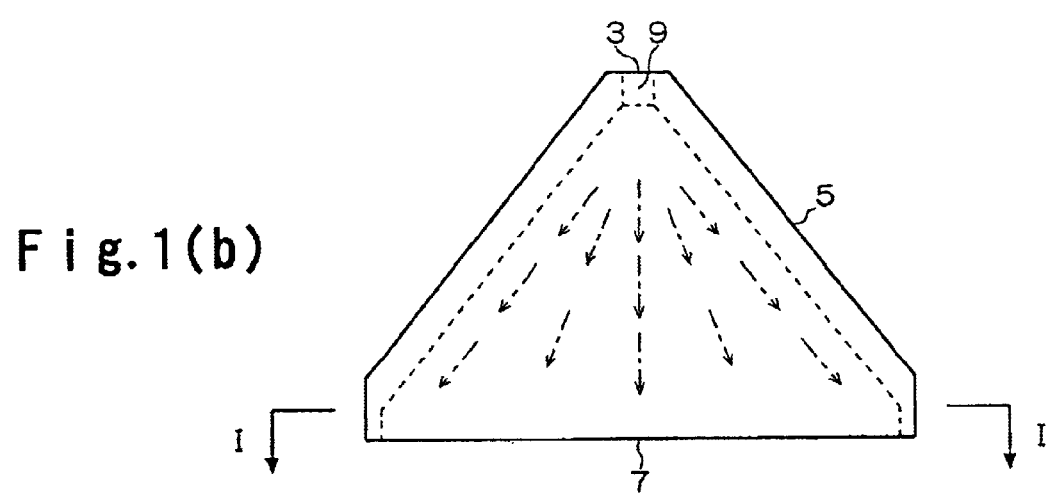
FIG. 1(b) is a front view of the die.
Figure 1C:
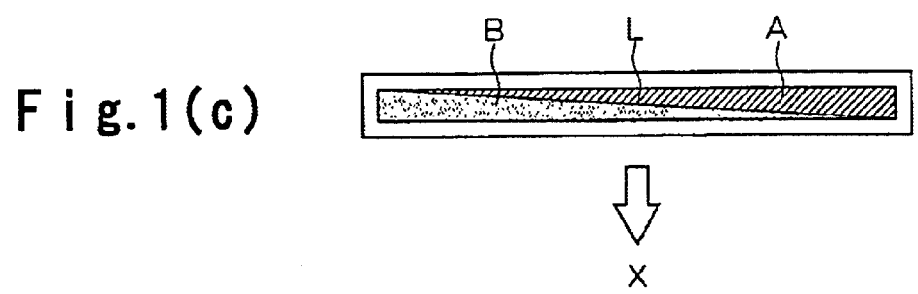
FIG. 1(c) is a sectional view along I—I line of FIG. 1(b).

In FIGS. 1(a) to (c), the die 1 for coating is equipped with an inlet 3 for injecting a plural type (two types in FIG. 1) of coating liquids A and B having different compositions on its top, and equipped with a linear exit 7 via a widening portion 5, opening in a slit form at the bottom of the widening portion, which broadens toward the end and which guides the coating liquids A and B from the inlet 3 along the streamline flow.

The die 1 is equipped with a guide partition wall 9 which compartmentalizes the plural type of the coating liquids A and B so that the plural type of the coating liquids A and B are compartmentalized into predetermined compartments and discharged at the linear exit 7. The guide partition wall 9 extends from the inlet 3, the inside of which is compartmentalized, to at least the widening portion 5, or as the case requires, from the inlet 3 to the linear exit 7.

The guide partition wall 9 is disposed so that the boundary L between the compartmentalized compartments at the linear exit 7 is at a slant relative to the direction X in which the die 1 is moved relatively to a substrate for coating (direction perpendicular to the longitudinal direction of the linear exit 7). For example, in a case where the position of one of diagonals at the linear exit 7 corresponds to the boundary L between the allocated compartments, the guide partition wall 9 is disposed at the position corresponding to the allocated compartments at the linear exit 7 via the streamline flow i.e. at the position of the corresponding diagonal at the inlet 3.

Now, the operation in the above process for producing a coating film will be explained below.

At the die 1 having the above constitution, a plural type of coating liquids A and B are allocated to the respective compartments of the inlet 3 divided by the guide partition wall 9 and simultaneously injected from a port (not shown).

The guide partition wall 9 guides the injected plural types of coating liquids A and B to the widening portion 5 while avoiding mixing of the coating liquids. The coating liquids A and B are guided in the widening portion 5 along the streamline flow toward the linear exit 7. At that time, the coating liquids A and B are transported to the linear exit 7 while maintaining their mutual relation in the compartments compartmentalized by the guide partition wall 9.

Coating of the film is carried out by moving the die 1 in the front direction X (direction perpendicular to the width direction of the widening die 1) relatively to a substrate for coating (not shown) (the die 1 is fixed and the substrate for coating is moved in general). By this operation, a coating film having an internal constitution corresponding to the allocated compartments at the linear exit 7 is formed.

Namely, as the boundary L between the allocated compartments at the linear exit 7 is at a slant relative to the direction X in the above operation, a coating film having such an internal constitution that the coating liquids A and B are superposed one on the other, and the composition is slanted in the thickness direction, is formed by the above operation.

Now, the coating film formed by the process for forming a coating film of the present invention will be explained below.

Figure 2A:
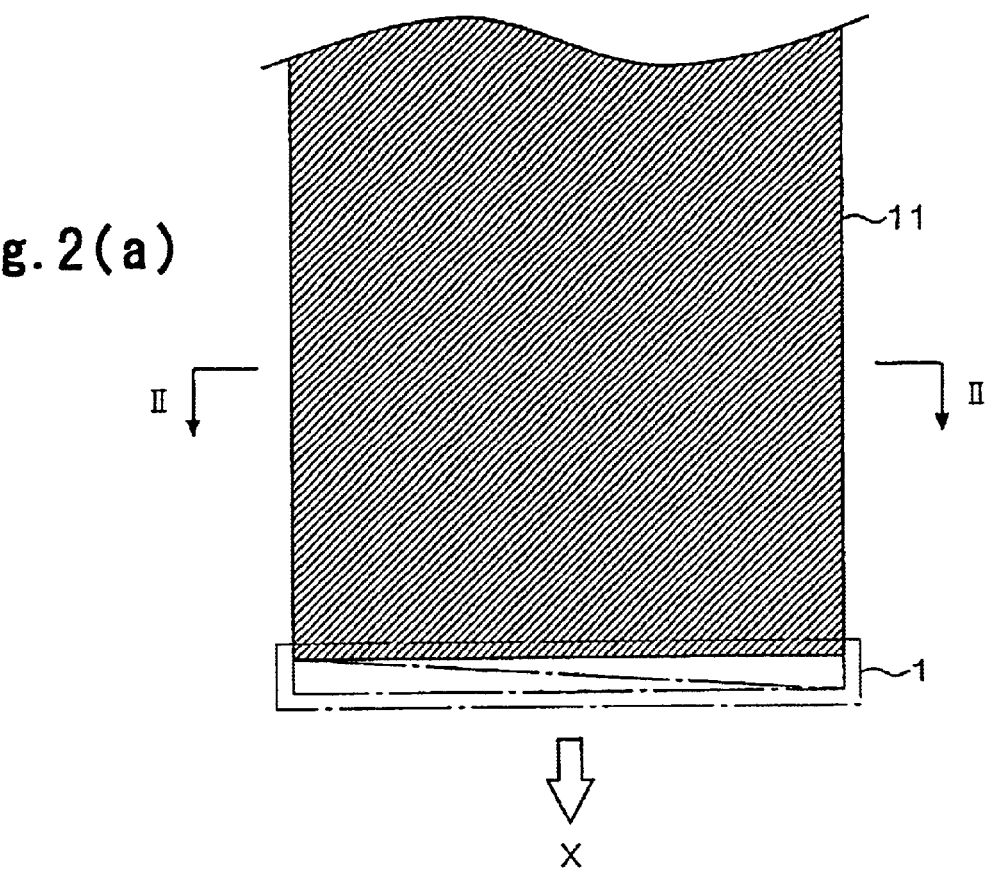
FIG. 2(a) is a plane view illustrating a coating film formed by the process of the present invention.
Figure 2B:
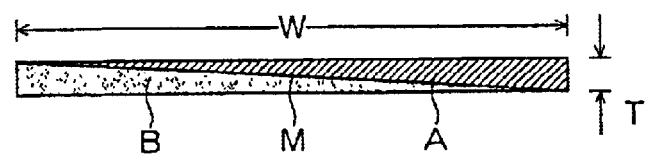
FIG. 2(b) is a sectional view along II—II line.

The coating film formed by the process for producing a coating film of the present invention is shown in a plane view of FIG. 2(*a*) and a sectional view along II—II line of FIG. 2(*b*).

In FIGS. 2(*a*) and (*b*), in a coating film 11 formed by the above production process, the coating liquids A and B are formed correspondingly to the allocated compartments at the linear exit 7 in an optional cross section perpendicular to the direction X in which the die 1 is moved relatively to the substrate for coating. Accordingly, the coating film 11 is constituted so that the coating liquids A and B are superposed one on the other at a slant with the boundary M at a slant in the thickness direction.

In the coating film 11, the two types of the coating liquids A and B are superposed one on the other, and the boundary M between them is slanted along the diagonal of the cross section. Namely, one coating liquid A occupies the entire thickness T of the coating film at one edge of the cross section (right edge in the drawing) and the other coating liquid B occupies the entire thickness T of the coating film at the other edge (left edge of the drawing), and at the intermediate portion of the width W of the coating film 11, the two types of the coating liquids A and B are slanted and superposed one on the other with a thickness allocation depending upon the position.

As mentioned above, the thickness of one coating liquid A gradually decreases from one end of the cross section, whereas the thickness of the other coating liquid B gradually increases from one end of the cross section, and the composition of the coating film 11 continuously changes in the direction of the cross line. Accordingly, the coating film 11 exhibits slant properties such that the properties continuously change in a cross line direction corresponding to the change in the composition.

Specifically, with respect to the properties of the coating film 11, the property of one coating liquid A is dominant at one edge of the cross section (right edge in the drawing), and the property of the other coating liquid B is dominant at the other edge (left edge in the drawing), is the properties at the intermediate portion correspond to the allocation of the two types of the coating liquids A and B.

In production of the membrane-electrode assembly 101 for solid polymer electrolyte fuel cells, the coating film having the above slant properties is applied to the polymer electrolyte membrane 103 and/or the catalyst layer 105*a* of the anode and/or the catalyst layer 105*b* of the cathode.

Specifically, as the reaction conditions gradually change along the flow path of the reaction gas which acts on the membrane-electrode assembly 101, at least one of the polymer electrolyte membrane 103 and the catalyst layers 105*a* and 105*b* is formed by cast film forming so as to impart slant properties corresponding to the change of the reaction conditions.

As mentioned above, the reaction environment corresponding to the change of the conditions can be secured by the slant properties of the polymer electrolyte membrane 103 or the catalyst layer 105*a* or 105*b*, whereby a cell reaction with a high efficiency at a uniform current density can be secured at the entire gas flow path. Accordingly, by the production process of the present invention, the reaction efficiency of the entire membrane-electrode assembly 101 can be improved.

Now, the other examples of the slanted allocation of the coating film will be explained below.

Examples of allocations of the guide partition wall at the inlet 3 are shown in FIGS. 3(*a*) to (*d*). In each of FIGS. 3(*a*) to (*d*), each of guide partition walls 9, 9*a* and 9*b* is constituted at a slant relative to the direction X in which the die 1 moves relatively to the substrate for coating (up and down direction in the drawings).

FIG. 3(*a*) illustrates an example wherein the guide partition wall 9 is disposed to cross a part in the width direction of the inlet 3 at a slant. The coating liquids A and B are slanted and superposed one on the other in part of the coating film in the width direction with an allocation corresponding to the compartments compartmentalized by the guide partition wall 9.

Figure 3A:
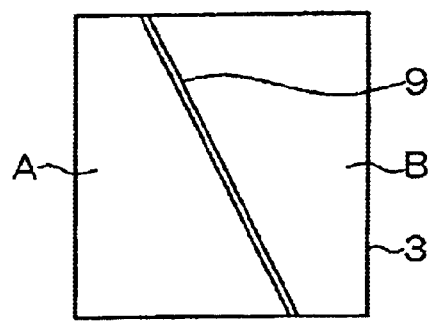
FIGS. 3(a) to (d) are diagrams illustrating examples of allocations of a guide partition wall at the inlet in the process of the present invention.
Figure 3B:
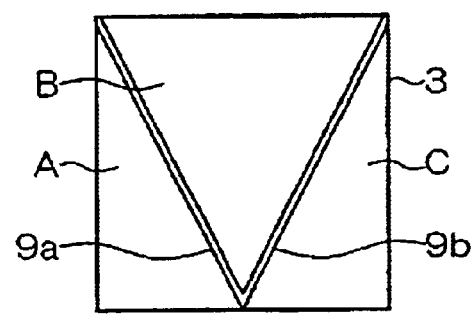

FIG. 3(b) illustrates an example wherein the guide partition walls 9a and 9b are disposed so that they cross the inlet 3 at a slant to divide the inlet in the width direction into two. The coating liquid A and B are slanted and superposed one on the other at one half portion in the width direction of the coating film, and the coating liquids B and C are slanted and superposed one on the other at the other half portion in the width direction of the coating film.

Figure 3C:
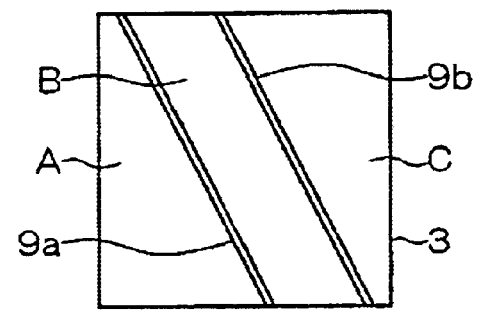

FIG. 3(c) illustrates an example wherein the guide partition walls 9a and 9b are disposed so that they cross different parts in the width direction of the inlet 3 at a slant. The coating liquids A, B and C are slanted and partially superposed one on another in three layers.

Figure 3D:
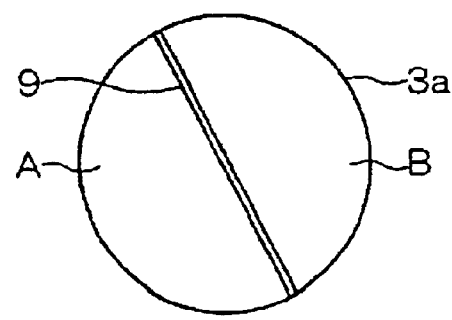
Figure 4:
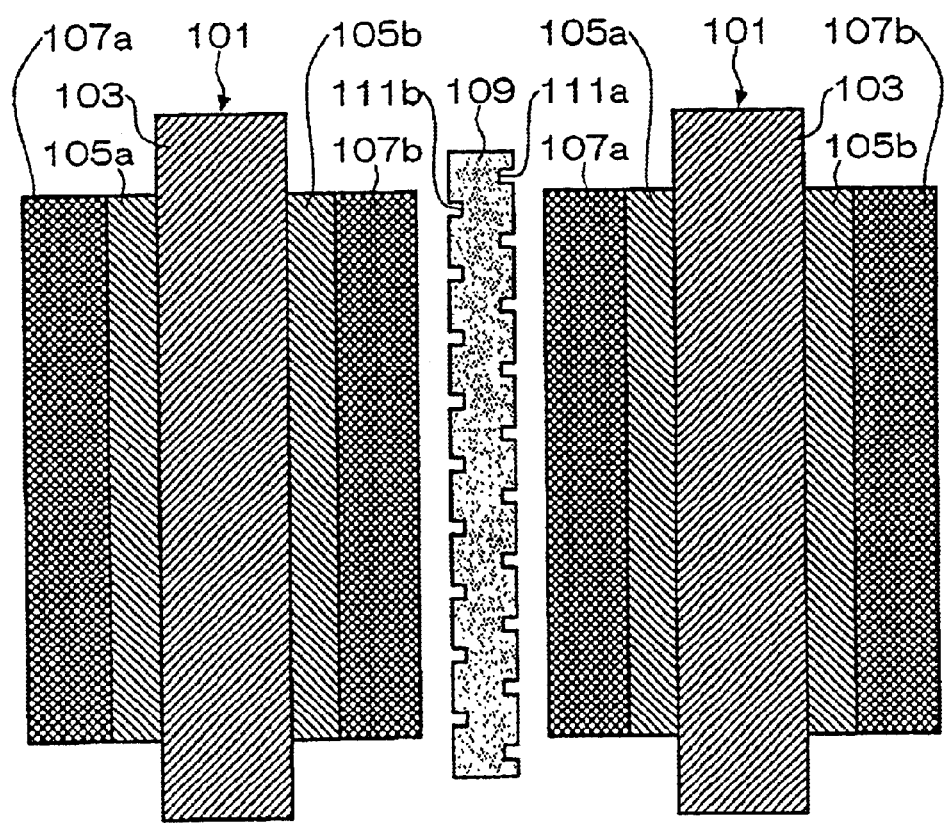
FIG. 4 is a sectional view illustrating a membrane-electrode assembly for solid polymer electrolyte fuel cells.
Figure 5:
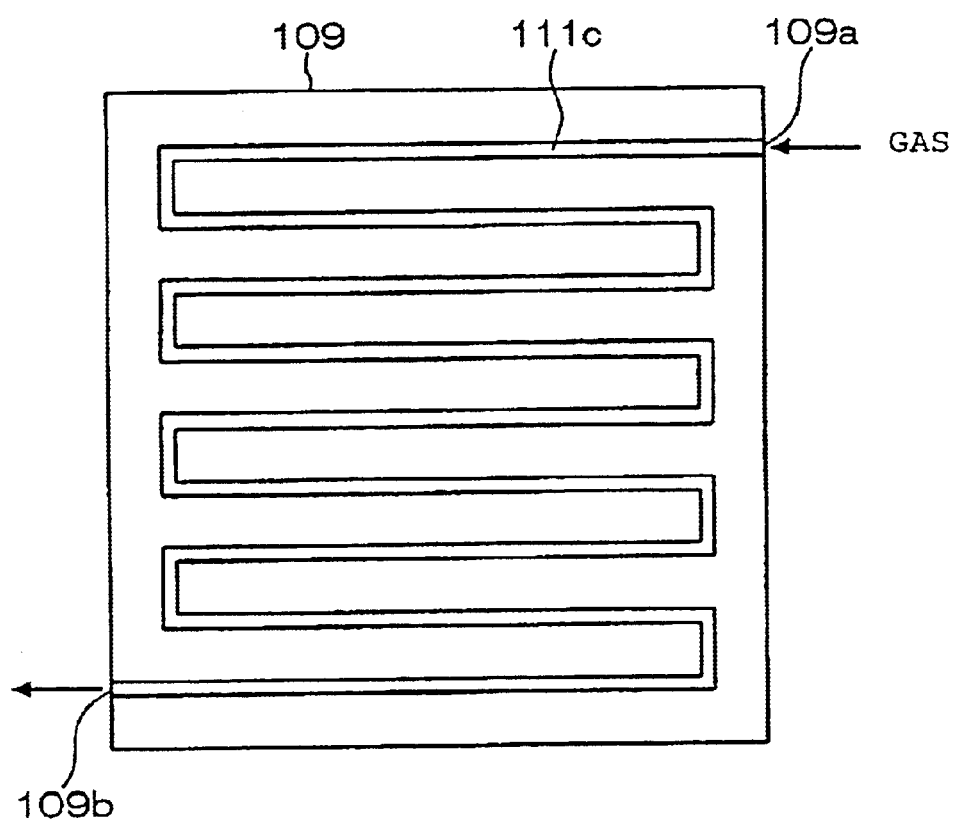
FIG. 5 is a diagram illustrating a constitution example 1 of a gas flow path of a separator.
Figure 6:
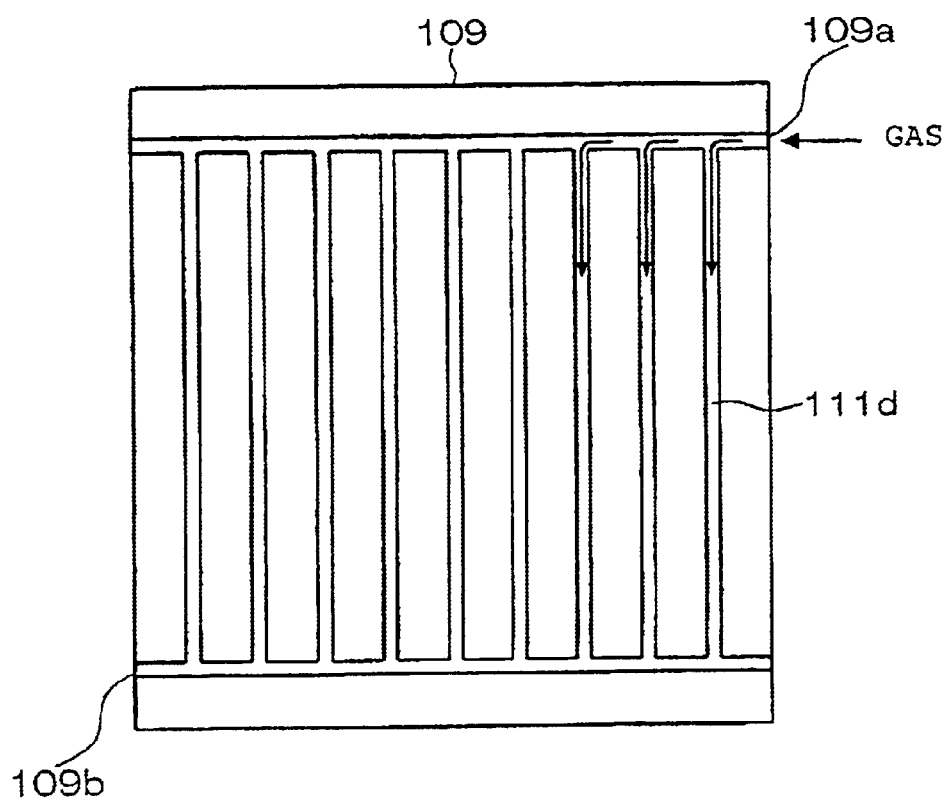
FIG. 6 is a diagram illustrating a constitution example 2 of a gas flow path of a separator.
Figure 7:
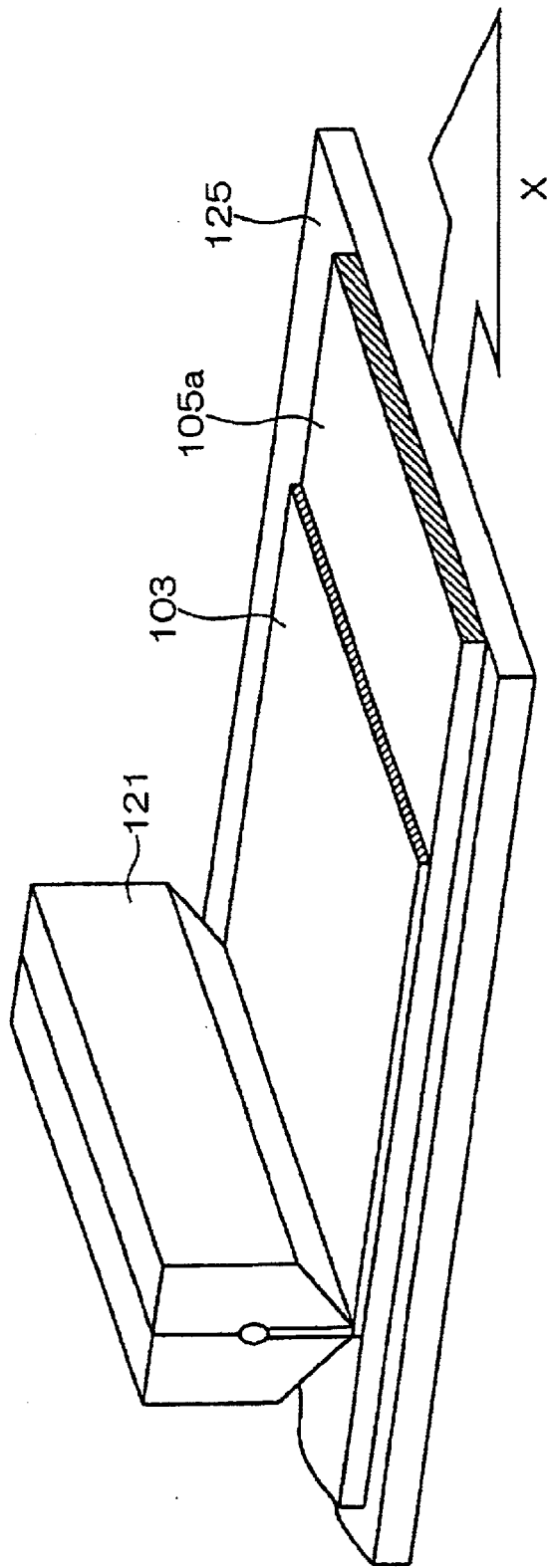
FIG. 7 is a perspective view illustrating a conventional cast film forming method.

FIG. 3(d) illustrates an example wherein the guide partition wall 9 is disposed to cross the circular inlet 3a at a slant. By making the inlet 3a movable, the slant angle can optionally be selected depending upon the superposition at a slant of the coating liquids A and B.

By means of the die 1 having the inlet 3 or 3a, a coating film is formed with an allocation corresponding to the compartment constitution. In the coating film, the coating liquids A, B and C are slanted and superposed one on another, as the guide partition walls 9, 9a and 9b are at a slant relative to the casting direction X (up and down direction in the drawings) of the die 1, and slant properties corresponding to the constitution of the coating film can be obtained.

In the above-described explanation of the coating film 11, as the two types of the coating liquids A and B are in contact with each other at the boundary M, they may be infiltrated and dispersed into each other, and the composition may continuously be changed into a so-called blurred state (such a state that the boundary M is unclear). The degree of this infiltration and diffusion in a blurred state may be determined by the compositions of the coating liquids A and B, the length of the guide partition wall 9 and the other infiltration and diffusion conditions.

Particularly with respect to the selection of the range of the guide partition wall 9, by optionally selecting the range of the guide partition wall 9 from a range extending from the inlet 3 of the die 1 to the linear exit 7, provided that the inlet 3 is included, the degree of infiltration and diffusion may be adjusted in the extrusion stage until the coating liquid A and B reach the substrate for coating. Further, it is also possible to provide two inlets 3 so that the two inlets 3 are separately connected to different compartments compartmentalized by the guide partition wall 9, and to introduce the coating liquids A and B from the different two inlets. Similarly, it is possible to provide at least three inlets when there are at least three types of coating liquids. Further, there may be a plurality of linear exits depending upon the number of the coating liquids.

In the present invention, the ion exchange resin constituting the catalyst layer 105a, 105b and/or the polymer electrolyte membrane 103 is preferably a fluorinated polymer having sulfonic acid groups, particularly preferably a perfluorocarbon polymer having sulfonic acid groups.

The catalyst contained in the catalyst layers 105a and 105b is preferably platinum, a metal in the same group as platinum or an alloy thereof. The dispersion medium contained in the coating liquid is not particularly limited, but preferred is one in which the ion exchange resin can be well dispersed, such as an alcohol or an ether.

With the membrane-electrode assembly 101 for solid polymer electrolyte fuel cells obtained by the process of the present invention, the following effects may, for example, be obtained.

In a solid polymer electrolyte fuel cell, a hydrogen gas and an oxygen gas are supplied to the anode and the cathode, respectively. The hydrogen and oxygen are consumed by the reaction to produce water at the cathode. Accordingly, the concentrations of the hydrogen and oxygen gases continuously and gradually decrease from the gas inlet toward the exit, and at the cathode, in a case where the gas is not supplied in a saturated state by water vapor, the water content in the gas continuously and gradually increases due to produced water from the gas inlet toward the exit.

According to the process of the present invention, the composition of the catalyst layer 105a or 105b or the polymer electrolyte membrane 103 in the plane can continuously be changed according to the continuous change of the above reaction gas concentration or the water content, and as a result, it becomes possible to carry out the reaction more uniformly in the plane, whereby moisture control, temperature control, etc. can be carried out more appropriately, and the reaction efficiency can be increased.

Now, the present invention will be explained with reference to a specific example. For example, in a case where a hydrogen gas reformated from a hydrocarbon type gas is supplied as a fuel gas to the anode, the gas usually contains CO. The CO concentration and the concentration ratio to the hydrogen gas in the supplied gas continuously change from the fuel gas inlet to the exit, as the hydrogen gas is consumed and decreased by an electrochemical reaction on the catalyst.

Here, in a case where platinum and a platinum-ruthenium alloy are used for the catalyst of the anode for example, by continuously changing the proportion of the platinum and the platinum-ruthenium alloy in the plane of the anodic catalyst layer 105a from the gas inlet to the exit corresponding to the CO concentration and the concentration ratio to the hydrogen gas, poisoning due to CO can efficiently be suppressed on the entire plane of the membrane-electrode assembly 101. As a result, the efficiency in the electrochemical reaction can be increased.

Further, water is produced by the reaction at the cathode, and in a case where the gas to be supplied is not humidified in a saturated state at the operating temperature or above, the amount of moisture in the gas gradually increases from the gas inlet to the exit. Accordingly, by continuously changing the mixing proportion of a resin having a high ion exchange capacity with a resin having a low ion exchange capacity so that an ion exchange resin having a high water content (having a high ion exchange capacity) is disposed in a large amount in the vicinity of the inlet rather than the gas exit, the reaction site can be increased in the entire plane of the membrane-electrode assembly 101, and a high output can be obtained.

Now, the present invention will be explained in further detail with reference to Examples. However, it should be understood that the present invention is by no means restricted to such specific Examples.

With respect to three types of membrane-electrode assemblies 101 of Example 1 wherein the composition of a cathodic catalyst layer was continuously slanted, Example 2 wherein the composition of a polymer electrolyte membrane was slanted, and Comparative Example 1 by a conventional coating method, the current densities at positions corresponding to the upstream hand, the midstream hand and the downstream hand of the gas flow path were measured.

With regard to the current densities, the initial output voltage and the current densities regarding the cell constitution wherein the anode side electrode was electrically divided into three (upstream, midstream and downstream hand from the cell inlet side) were measured with respect to two levels at a low density (0.2 A/cm$^2$) and at a high density (0.5 A/cm$^2$). The results are shown in Table 1.

EXAMPLE 1

A liquid containing a copolymer comprising polymerization units derived from tetrafluoroethylene and polymerization units derived from $CF_2=CF-OCF_2CF(CF_3)O(CF_2)_2SO_3H$ and having an ion exchange capacity of 1.10 meq/g dry resin (hereinafter referred to as "copolymer A") and a platinum-ruthenium alloy-supported carbon (with a platinum:ruthenium molar ratio of 4:6 and a carbon:alloy mass ratio of 1:1) in a mass ratio of 5:9 dissolved or dispersed in ethanol, having a solid content of 10 mass %, was prepared, as a "dispersion for formation of an anodic catalyst layer".

A dispersion containing the copolymer A and a platinum-supported carbon (with a platinum:carbon mass ratio of 1:1) in a mass ratio of 1:2 and ethanol as a dispersion medium, having a solid content of 13.7 mass %, was prepared, as a "dispersion 1 for formation of a cathodic catalyst layer".

Further, using a copolymer comprising the same polymerization units as in the copolymer A and having an ion exchange capacity of 1.33 meq/g dry resin (hereinafter referred to as "copolymer B"), a dispersion containing the copolymer B and a platinum-supported carbon (in a platinum:carbon mass ratio of 1:1) in a mass ratio of 1:2 and ethanol as a dispersion medium, having a solid content of 14.5 mass %, was prepared, as a "dispersion 2 for formation of a cathodic catalyst layer".

Then, the dispersion for formation of an anodic catalyst layer was coated on one side of a polypropylene (hereinafter referred to as PP) film with a 50 μm thickness as a substrate for coating by die coating so that the platinum-ruthenium alloy would attach in an amount of 0.50 mg/cm$^2$, and the coating was dried to form an anodic catalyst layer 105a.

A cathodic catalyst layer 105b was formed by using a die 1 having an inlet 3 into which the two types of coating liquids i.e. the dispersion 1 for formation of a cathodic catalyst layer and the dispersion 2 for formation of a cathodic catalyst layer were introduced from two ports, and a linear exit 7 through which these coating liquid were discharged. The die 1 has a guide partition wall 9 slanted so that the two types of the coating liquids which pass in the die 1 are superposed one on the other in the thickness direction of the linear exit 7 at their contact portion, from the inlet 3 toward the linear exit 7, as shown in FIGS. 1(a) to (c).

Using this die 1, the two types of the coating liquids were coated on one side of a PP film with a 50 μm thickness as a substrate for coating so that the coating liquids were continuously unevenly distributed (the amount of platinum attached was 0.40 mg/cm$^2$). The coating film was dried to form the cathodic catalyst layer 105b.

The PP film having the cathodic catalyst layer 105b formed on one side thereof and the PP film having the anodic catalyst layer 105a formed on one side thereof were laid with the catalyst layers faced inside, and an ion exchange membrane (tradename: Flemion HR, manufactured by Asahi Glass Company, Limited, ion exchange capacity: 1.1 meq/g dry resin, dry membrane thickness: 30 μm) as a polymer electrolyte membrane 103 was interposed between them, followed by hot-pressing.

The hot pressing was carried out at 130° C. under 3 MPa for 4 minutes. After the hot-pressing, the PP film was peeled off from each of the anodic and cathodic catalyst layers 105a and 105b, whereby these catalyst layers were transferred onto the membrane to form a membrane-electrode assembly 101 consisting of the catalyst layers and the ion exchange membrane.

The membrane-electrode assembly 101 was cut to an effective electrode surface area of 25 cm$^2$, and mounted in a cell performance tester. Hydrogen gas and air were supplied to the anode and the cathode, respectively, and a power generation test was carried out at a cell temperature of 80° C., an anode humidified temperature of 75° C. and a cathode humidified temperature of 50° C.

The slant direction of the cathodic catalyst layer 105b was such that the portion where the dispersion 2 for formation of a cathodic catalyst layer was coated in a large amount was disposed on the air inlet side, and the portion where the dispersion was coated in a small amount was disposed on the air exit side.

EXAMPLE 2

For production of a polymer electrolyte membrane 103, a die 1 as shown in FIGS. 1(a) to (c), having an inlet 3 into which two types of coating liquids "coating liquid 1 for formation of an ion exchange membrane" containing 13.5 mass % of the copolymer A and ethanol as a solvent and "coating liquid 2 for formation of an ion exchange membrane" containing 13 mass % of the copolymer B and ethanol as a solvent were introduced from two ports, and a linear exit 7 through which these coating liquids were discharged, was used.

The die 1 has a guide partition wall 9 slanted so that the two types of the coating liquids which pass in the die 1 are superposed one on the other in the thickness direction of the linear exit 7 at their contact portion, from the inlet 3 to the linear exit 7. Using the die 1, the two types of the coating liquids were coated on a PP film so that they were continuously unevenly distributed. The coating film was dried in an oven of 80° C. for 10 minutes, and the PP film was peeled off to form a polymer electrolyte membrane 103 having a thickness of 30 μm.

Then, an anodic catalyst layer 105a was formed in the same manner as in Example 1.

Further, a dispersion for formation of a cathodic catalyst layer (the same one as the dispersion for formation of a cathodic catalyst layer of Example 1) was coated on one side of a PP film with a 50 μm thickness as a substrate for coating by die coating (amount of platinum attached was 0.50 mg/cm$^2$). The coating film was dried to form a cathodic catalyst layer 105b having a uniform composition.

The PP film having the cathodic catalyst layer 105b formed on one side thereof and the PP film having the anodic catalyst layer 105a formed on one side thereof were laid with the catalyst layers faced inside, and the polymer electrolyte membrane 103 having a thickness of 30 μm prepared in the present Example was interposed between them, followed by hot-pressing. The hot-pressing was carried out under the same conditions as in Example 1 to obtain a membrane-electrode assembly 101.

The membrane-electrode assembly 101 was subjected to a power generation test in the same manner as in Example 1.

The slant direction of the polymer electrolyte membrane 103 was such that the portion where the copolymer B was present in a large amount was disposed on the air inlet side.

COMPARATIVE EXAMPLE 1

A membrane-electrode assembly 101 was prepared in the same manner as in Example 1 except that the dispersion 1 for formation of a cathodic catalyst layer alone was used to prepare a cathodic catalyst layer 105b having a uniform composition. Using the membrane-electrode assembly 101, a power generation test was carried out in the manner as in Example 1. With respect to each of the cells of Examples 1 and 2 and Comparative Example 1, the cell voltages at 0.2 (A/cm$^2$) and 0.5 (A/cm$^2$) and current densities at the upstream hand, midstream hand and downstream hand of the gas flow path were measured. The results are shown in Table 1.

TABLE 1

|  | 0.2 A/cm$^2$ | | | | 0.5 A/cm$^2$ | | | |
| --- | --- | --- | --- | --- | --- | --- | --- | --- |
| Current density | Cell voltage mV | Upstream current density A/cm$^2$ | Midstream current density A/cm$^2$ | Downstream current density A/cm$^2$ | Cell voltage mV | Upstream current density A/cm$^2$ | Midstream current density A/cm$^2$ | Downstream current density A/cm$^2$ |
| Ex. 1 | 755 | 0.19 | 0.2 | 0.21 | 641 | 0.53 | 0.51 | 0.46 |
| Ex. 2 | 748 | 0.18 | 0.2 | 0.22 | 644 | 0.53 | 0.50 | 0.47 |
| Comp. Ex. 1 | 725 | 0.14 | 0.2 | 0.26 | 631 | 0.41 | 0.51 | 0.58 |

It was evident from Table 1 that there is substantially no difference in current density among the upstream hand, midstream hand and downstream hand of the gas flow path, and the cell voltage is high, in Examples as compared with Comparative Example. Namely, the current density is made uniform in the plane of the membrane-electrode assembly 101, whereby the cell voltage becomes high.

As explained above, according to the production process of the present invention, by supplying at least two types of coating liquids having different compositions to a die, a coating film, the composition of which continuously changes, can be formed by a single coating step.

Therefore, according to the production process of the present invention, the current density distribution in a membrane-electrode assembly is made uniform, whereby high cell performances can be obtained with a simple process without increase in cost.

The entire disclosure of Japanese Patent Application No. 2001-284538 filed on Sep. 19, 2001 including specification, claims, drawings and summary is incorporated herein by reference in its entirety.

What is claimed is:

1. A process for producing a membrane-electrode assembly for solid polymer electrolyte fuel cells comprising a polymer electrolyte membrane, and a cathode and an anode facing each other with the polymer electrolyte membrane interposed therebetween, each having a catalyst layer adjacent to the polymer electrolyte membrane, which comprises forming at least one of the catalyst layers of the cathode and the anode by using coating liquids containing a catalyst and an ion exchange resin, wherein a die equipped with an inlet to introduce the coating liquids and a linear exit from which the coating liquids are discharged, the die as a guide partition wall to compartmentalize the inlet into a plurality of compartments extending toward the linear exit, a plurality of coating liquids having different compositions is introduced from the inlet so that they are not mixed with each other and pass through the plurality of the compartments separately, and the compartmentalizing direction of the guide partition wall is slanted relative to the direction in which a substrate for coating which faces the linear exit moves relatively to the die, and at least one of the die and the substrate for coating is moved so that the substrate for coating relatively moves at substantially right angles to the longitudinal direction of the linear exit to coat the substrate for coating with the coating liquids to form the catalyst layer, thereby continuously changing the composition of the catalyst layer in at least some part in the longitudinal direction of the linear exit of the die.

2. The process for producing a membrane-electrode assembly for solid polymer electrolyte fuel cells according to claim 1, wherein the catalyst layer is formed to be uniform in thickness.

3. The process for producing a membrane-electrode assembly for solid polymer electrolyte fuel cells according to claim 1, wherein the inside of the inlet is compartmentalized into two compartments by one guide partition wall, and two types of coating liquid are injected from the respective compartments separately.

4. The process for producing a membrane-electrode assembly for solid polymer electrolyte fuel cells according to claim 3, wherein the boundary between the two compartments for the two types of coating liquids at the linear exit is made to correspond to the position of one of diagonals of the linear exit by disposing the guide partition wall on the position of the corresponding diagonal at the inlet.

5. The process for producing a membrane-electrode assembly for solid polymer electrolyte fuel cells according to claim 3, wherein the inlet is a rectangle or a square, and the guide partition wall is disposed so that it crosses a part in the width direction of the inlet at a slant.

6. The process for producing a membrane-electrode assembly for solid polymer electrolyte fuel cells according to claim 3, wherein the inlet is circular or elliptic, and the guide partition wall is disposed so that it crosses the inlet at a slant.

7. A process for producing a membrane-electrode assembly for solid polymer electrolyte fuel cells comprising a polymer electrolyte membrane, and a cathode and an anode facing each other with the polymer electrolyte membrane interposed therebetween, each having a catalyst layer disposed adjacent to the polymer electrolyte membrane, which comprises forming the polymer electrolyte membrane by using coating liquids containing an ion exchange resin, wherein a die equipped with an inlet to introduce the coating liquids and a linear exit from which the coating liquids are discharged, the die has a guide partition wall to compartmentalize the inlet into a plurality of compartments extending toward the linear exit, a plurality of coating liquids having different compositions is introduced from the inlet so that they are not mixed with each other and pass through the plurality of the compartments separately, and the compartmentalizing direction of the guide partition wall is slanted relative to the direction in which a substrate for coating which faces the linear exit moves relatively to the die, and at least one of the die and the substrate for coating is moved so that the substrate for coating relatively moves at substantially right angles to the longitudinal direction of the linear exit to coat the substrate for coating with the coating liquids to form the polymer electrolyte membrane, thereby continuously changing the composition of the polymer electrolyte membrane in at least some part in the longitudinal direction of the linear exit of the die.

8. The process for producing a membrane-electrode assembly for solid polymer electrolyte fuel cells according to claim 1, wherein the polymer electrolyte membrane is formed to be uniform in thickness.

9. The process for producing a membrane-electrode assembly for solid polymer electrolyte fuel cells according to claim 7, wherein the inside of the inlet is compartmentalized into two compartments by one guide partition wall, and two types of coating liquid are injected from the respective compartments separately.

10. The process for producing a membrane-electrode assembly for solid polymer electrolyte fuel cells according to claim 9, wherein the boundary between the two compartments for the two types of coating liquids at the linear exit is made to correspond to the position of one of diagonals of the linear exit by disposing the guide partition wall on the position of the corresponding diagonal at the inlet.

11. The process for producing a membrane-electrode assembly for solid polymer electrolyte fuel cells according to claim 9, wherein the inlet is a rectangle or a square, and the guide partition wall is disposed so that it crosses a part in the width direction of the inlet at a slant.

12. The process for producing a membrane-electrode assembly for solid polymer electrolyte fuel cells according to claim 9, wherein the inlet is circular or elliptic, and the guide partition wall is disposed so that it crosses the inlet at a slant.

13. A process for producing a membrane-electrode assembly for solid polymer electrolyte fuel cells, comprising:

providing a die having an inlet configured to introduce a plurality of coating liquids, a linear exit configured to discharge the plurality of coating liquids, and at least one guide partition wall partitioning the inlet into compartments extending to the linear exit and slanted relative to the direction in which a substrate facing the linear exit moves relatively to the die;

introducing the plurality of coating liquids from the inlet into the compartments, respectively and passing the plurality of coating liquids through the compartments separately; and moving at least one of the die and substrate such that the substrate relatively moves at substantially right angles to the longitudinal direction of the linear exit to coat the substrate with the plurality of coating liquids, thereby forming one of a polymer electrolyte membrane, a cathode catalyst layer, and an anode catalyst layer.

14. The process for producing a membrane-electrode assembly for solid polymer electrolyte fuel cells according to claim 13, wherein the moving comprises forming one of the polymer electrolyte membrane, cathode catalyst layer, and anode catalyst layer in a uniform thickness.

15. The process for producing a membrane-electrode assembly for solid polymer electrolyte fuel cells according to claim 13, wherein the compartments comprise two compartments partitioned by one guide partition wall, and the plurality of coating liquids comprises two types of coating liquids injected separately into the two compartments, respectively.

16. The process for producing a membrane-electrode assembly for solid polymer electrolyte fuel cells according to claim 15, wherein the guide partition wall diagonally partitions the two compartments for the two types of coating liquids from the inlet to the linear exit.

17. The process for producing a membrane-electrode assembly for solid polymer electrolyte fuel cells according to claim 15, wherein the inlet is one of a rectangle and a square, and the guide partition wall is positioned to cross a part in the width direction of the inlet at a slant.

18. The process for producing a membrane-electrode assembly for solid polymer electrolyte fuel cells according to claim 15, wherein the inlet is one of circular and elliptic, and the guide partition wall is positioned to cross the inlet at a slant.

* * * * *